United States Patent [19]

Back, Jr.

[11] 4,256,214

[45] Mar. 17, 1981

[54] SYSTEM FOR OVERHEAD TRANSPORT OF PANEL MEMBERS

[75] Inventor: Harry E. Back, Jr., Orangeburg, S.C.

[73] Assignee: Champion International Corporation, Stamford, Conn.

[21] Appl. No.: 33,973

[22] Filed: Apr. 27, 1979

[51] Int. Cl.³ .............................................. B65G 47/46
[52] U.S. Cl. ..................................... 198/367; 198/370; 198/424; 198/637; 198/689; 271/180; 271/300; 414/51; 414/73
[58] Field of Search ................ 198/367, 370, 422, 424, 198/637, 689, 635; 414/72–75, 51; 271/180, 197, 300

[56] References Cited

U.S. PATENT DOCUMENTS

| | | | |
|---|---|---|---|
| 3,305,233 | 2/1967 | Cody | 271/197 X |
| 3,500,999 | 3/1970 | Lippke | 271/300 X |

Primary Examiner—Robert B. Reeves
Assistant Examiner—Douglas D. Watts
Attorney, Agent, or Firm—Evelyn M. Sommer

[57] ABSTRACT

A system for transporting panel members to a plurality of selected sorting locations includes two pair of laterally spaced, elevated, endless conveyor belts defining a path of travel coinciding with the sorting locations. The belts in each pair thereof are also laterally spaced to define a longitudinally extending slot therebetween. An air plenum disposed between opposite sides of each belt communicates with the slots and is coupled with an air pump to produce suction through the slot which releasably holds the panels against the belts as the latter carry the panels along the path of travel. Selectively actuatable, force transmitting mechanism disposed adjacent each of the sorting locations initially breaks the air seal between the leading edge of the panels and the belts, while deflection structure is provided to peel the panels away from the belts to permit gravity induced delivery thereof to the sorting locations.

6 Claims, 2 Drawing Figures

SYSTEM FOR OVERHEAD TRANSPORT OF PANEL MEMBERS

TECHNICAL FIELD

This invention generally relates to industrial transportation systems and deals more particularly with a system for transporting and sorting panel members into selected locations.

BACKGROUND AND BRIEF DESCRIPTION

Various types of industrial conveyor line type trnsport systems have been devised in the past to deliver parts or components between assembly or storage locations. When employed for transporting rather large articles, such as flat panel members, these prior art transport systems have included various mechanized arms and assemblies for holding each panel on a conveyor line in a predetermined position for delivery along a path of travel to a selected location. When the panel member reached the location to which it was to be delivered, the mechanized arms were actuated to mechanically release the panel member for delivery to a bin or like storage area.

These prior art transportsystems were undesirable from several standpoints. First, it was necessary to initially position the panel members accurately within the mechanical arms. Secondly, the successful delivery of the panel members from the conveyor line was dependent upon smooth, consistent operation of the mechanical arms, which, because of the mechanism involved, did not always function reliably, and in any event, required regular maintenance. Perhaps even more importantly, these prior art mechanisms involved a certain amount of time delay in grasping and releasing the panel members, consequently, the rate at which the conveyor could be operated was limited by the reaction time of the mechanical arms.

The present invention eliminates the above-mentioned deficiencies inherent in prior art transport systems by providing a vacuum operated system that does not depend on mechanized arms and therefore allows the conveyor line to operate more reliably at a substantially increased rate. According to the present system, an overhead conveyor line comprises two pair of laterally spaced, endless belts extending longitudinally along a path of travel above a plurality of delivery or sorting locations. The belts in each pair thereof are also laterally spaced apart to define a longitudinally extending slot therebetween. An air plenum disposed between opposite sides of each of the belts communicates with each of the slots and with an air pump which draws air through the slot into the plenum thereby creating a suction or vacuum within the slot adjacent the lower exterior face of each of the belts which releasably holds the panel members on the belt beneath the conveyor line. Selectively actuatable, force transmitting mechanism disposed at each of the delivery locations between each pair of belts shift downwardly into engagement with the leading edge of a panel member passing therebeneath to initially break the air seal between such leading edge and the belts. Stationary deflection structure subsequently engages the leading edge of the panel member to "peel" the latter completely away from the belt while a stop member engages the leading edge to limit further movement thereof along the path of travel. Gravity then draws the panel member away from the conveyer line toward the delivery area. The actuatable mechanism may be selectively operated to permit sorting of the panel members into various groups.

BRIEF DESCRIPTION OF THE DRAWINGS

In the drawings, which form an integral part of the specification, and are to be read in conjunction therewith, and in which like reference numerals are employed to represent like parts in the varous views.

DETAILED DESCRIPTION OF THE INVENTION

Figure 1:
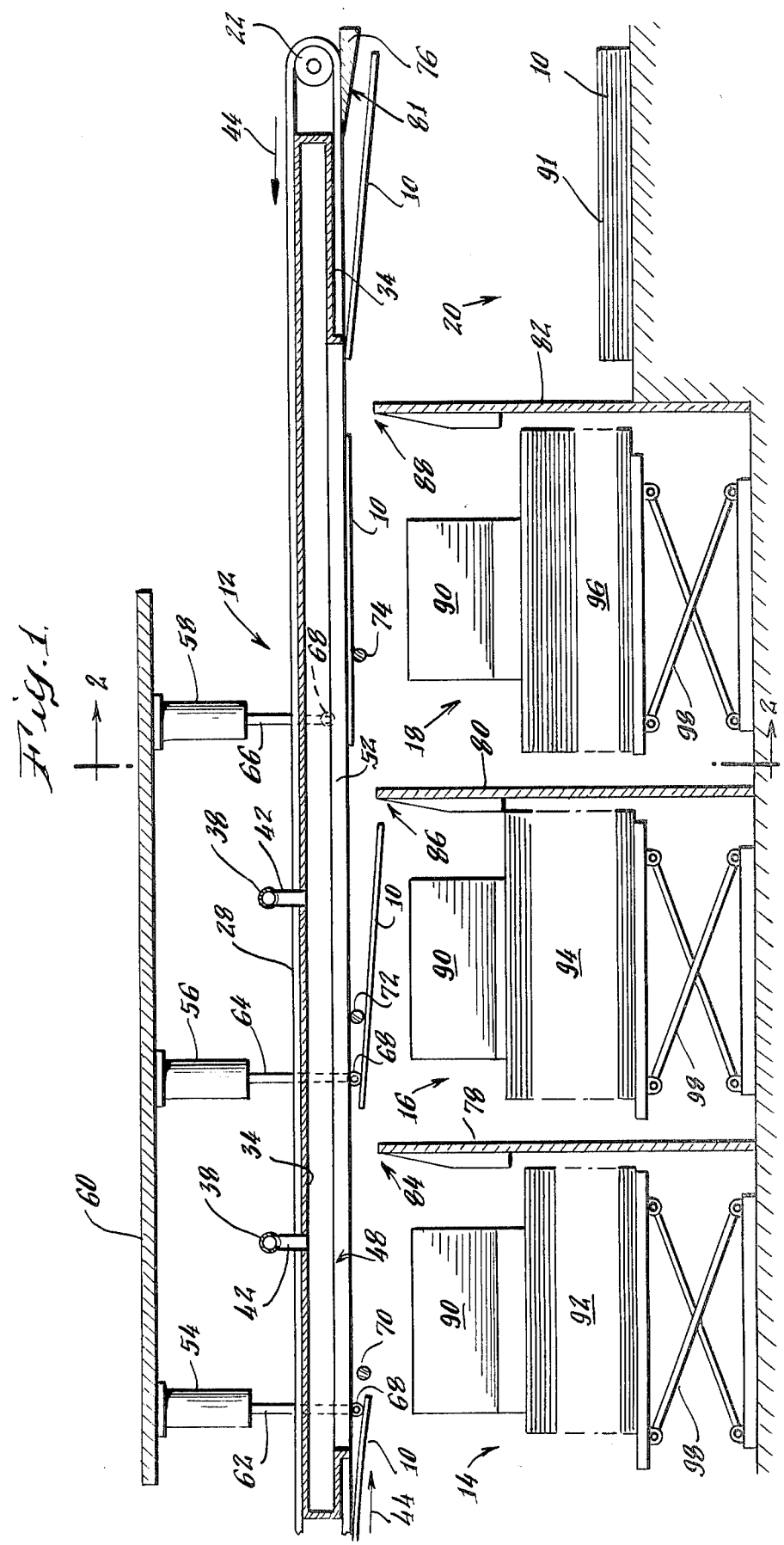
FIG. 1 is a fragmentary, longitudinal sectional view of the transport system which forms the preferred embodiment of the present invention.

Referring to the drawings, the present invention is concerned with improvements in the speed and reliability in which a plurality of flat panel members 10 are transported, and selectively removed from a conveyor line, generally indicated by the numeral 12, for delivery to a number of aligned, side-by-side sorting bins 14, 16, 18 and 20. The conveyor line 12 includes a pair of horizontally extending, spaced roller members, only one of which is shown herein and is indicated by the numeral 22; the roller members define a plane within which the conveyor 12 operates which is spaced above the storage bins 14-20. A first pair of flexible belt members 24 and 26 are trained around one side of the roller member 22 while a second set of similar belts 28 and 30 are trained around the other end of the roller member 22. A central spacing 31 is provided between belts 26 and 28 near the longitudinal midpoint of the roller member 22, while a lateral spacing is provided between the belts 24 and 26 as well as between belts 28 and 30.

A pair of air plenums 32 and 34 are respectively disposed between the first pair of belts 24 and 26 and between the second pair of belts 28 and 30, and extend essentially the entire length of the conveyor line 12. Air plenums 32 and 34 are placed in communication with each other by a plurality of connecting tubes 36 and further communicate with suitable means for creating a vacuum such as an air pump (not shown) which is operably coupled with a distribution conduit 38 that communicates with air plenums 32 and 34 through distribution tubes 40 and 42 respectively extending through upper regions of the spacing between belts 24 and 26, and belts 28 and 30.

Figure 2:
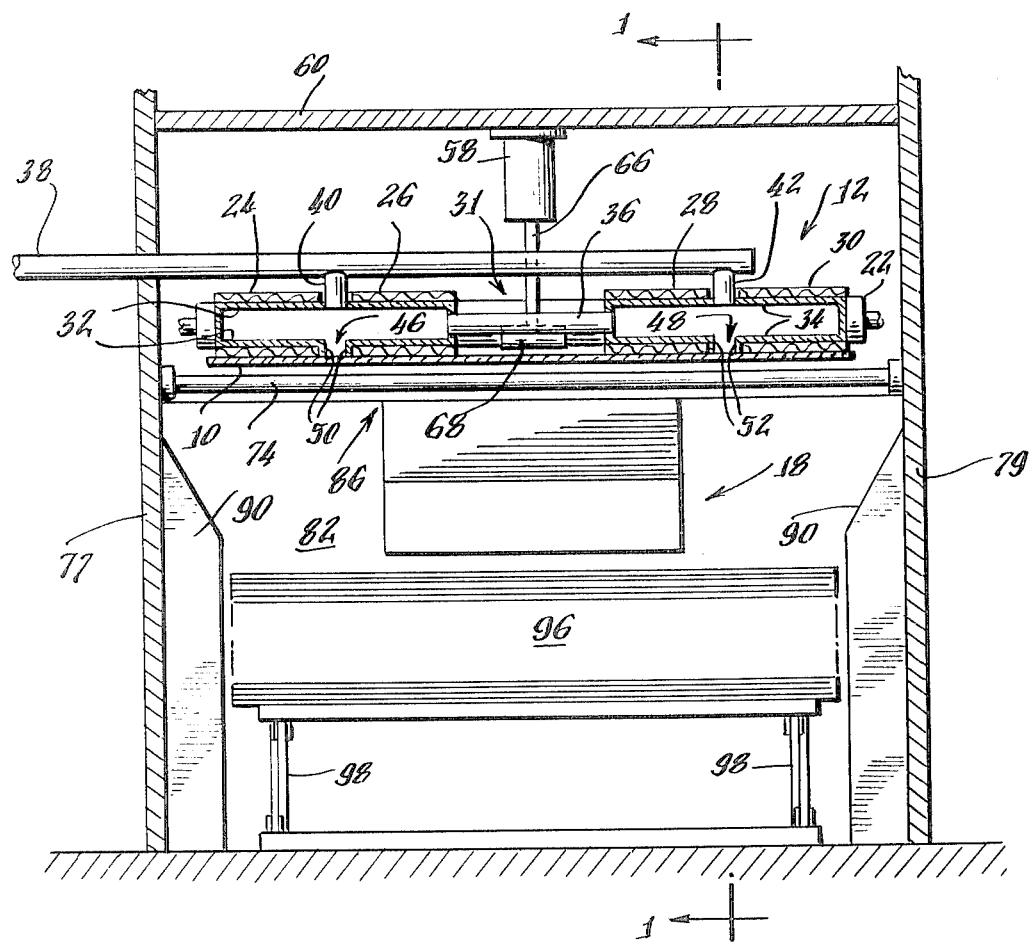
FIG. 2 is a sectional view taken along the line 2—2 in FIG. 1.

Air plenums 32 and 34 may be formed having an essentially rectangular cross section, as shown herein in FIG. 2, to allow the upper and lower, opposed exterior surfaces thereof to slidably engage and thereby support portions of the belts 24, 26, 28 and 30. A suitable source of power (not shown) is coupled with the roller member 22 in a manner which drives the belts 24, 26, 28 and 30 in a direction indicated by the arrows 44 so that the lower side of such belts opposing the bins 14–20 move in a left to right direction as viewed in FIG. 1.

The air plenums 32 and 34 include slotted areas 46 and 48 respectively extending essentially the entire length of the conveyor line 12 and laterally aligned with the spacing between the respective pairs of belts 24 and 26, and 28 and 30. A pair of opposed, parallel lips 50 and 52 formed integral with the bottom walls of the plenums 32 and 34 extend downwardly into the respective slots 46 and 48 in order to prevent the belts 24 and 26, and 28 and 30 from shifting laterally into blocking relationship with the slotted areas 46 and 48. From the foregoing, it may be appreciated that the conveyor line 12 presents planar surface areas in the nature of belts 24–30 which are spaced above each of the sorting bins 14–20 in opposed relationship to the latter that are movable along a path of travel above the storage bins 14–20. Further, it is apparent at this point that air suction means are provided adjacent the conveyor line 12 and coextensive with the latter for producing an upwardly directed air suction on opposite lateral sides of the conveyor line 12 and essentially throughout the entire length thereof.

Means for removing the panel members 10 from the conveyor line 12 include a plurality of selectively actuatable, elevationally shiftable members as at 54, 56 and 58, herein disclosed as hydraulically or pneumatically actuated motor members including a stationary portion suitably secured to a horizontal support 60 spaced above the conveyor line 12, and vertically reciprocable rod members respectively designated by the numerals 62, 64 and 66. Each of the rod members 62, 64 and 66 includes a roller member 68 rotatably mounted on the free lower extremity thereof and extend longitudinally along a vertical axis which is disposed toward the left, or forward area of the respectively associated sorting bins 14–20. Roller members 68 are shiftable, upon operation of the corresponding motor member 54–58, from a position in which the lower edges of such roller members 68 are disposed immediately above a horizontally extending plane which includes the upper face of a panel member 10 therebeneath, and a lower position in which such lower edges of the roller member 68 are disposed beneath the above-mentioned reference plane as shown in FIG. 1 in connection with the motor member 54.

The panel removing means further includes a plurality of horizontally extending, deflection members 70, 72, 74 and 76 respectively associated with the storage bins 14–20. As disclosed herein, the deflection members 70, 72 and 74 comprise bar members of circular cross-section extending between, and secured to the spaced apart, vertical support walls 77 nd 79. Each of the deflection members 70–74 are respectively spaced somewhat forwardly, toward the left as viewed in FIG. 1, of the corresponding storage bins 14–18 with respect to the direction of travel of the conveyor line 12 but are spaced slightly behind or to the right, of the respectively associated roller members 68. Upper edges of the deflection members 70–74 are spaced sufficiently below the lower face of the panel members 10 moving along the conveyor line 12 to ordinarily permit free passage of such panel members 10 thereabove. Lower edges of each of the deflection members 70–74 are spaced slightly below the lower edges of the corresponding respective rollers member 68 when the latter are shifted to their lower most position. Deflection member 76 comprises a triangularly shaped cross-section, one apex of which is disposed immediately adjacent the lower face of the belts 24–30 and may slidably engage the latter while an inclined face 81 of the deflection member 76 extends away from the apex thereof in a direction downwardly away from the direction of travel 44 of the belts 24–30.

Finally, the panel member removing means also includes an abutment, or stop structure herein disclosed as vertical walls 78, 80 and 82 which extend transversely to the conveyor line 12 and are disposed at the rearward extremity of the associated storage bins 14–18 with respect to the path of travel of the lower face of the belts 24–30. Walls 78–82 may be suitably secured to the underlying supporting surface, and/or the support walls 78 and 80 respectively include upper edge portions 84, 86 and 88 which are respectively spaced slightly below the elevation of the lower edges of the corresponding deflection members 70, 72 and 74. Conventional paddle or other types of deflection structure 90 may be provided on opposite lateral sides of each of the storage bins 14–18 to assure that the panel members 10 are delivered to the storage locations 14–18 in a manner which results in square stacks 92, 94 and 96 of such panel members 10. Conventional, power operated elevated structure, such as the scissors mechanism 98 may be provided beneath each of the stacks 92–96 to support and selectively lower the latter as the load accumulates.

Turning now to the operation of the invention, the panel members 10 are first loaded from a source thereof onto the conveyor line 12 by disposing such panel members 10 in a horizontal position and bringing the same into proximity with the lower faces of the belts 24–30, in lateral alignment with the latter. As a panel member 10 is drawn into proximity with the belts 24–30, air suction within the slotted portions 46 and 48 draw the panel member 10 into face-to-face contact with the belts 24–30 and create an air seal therebetween which then suspends the panel member 10 on the conveyor line 12. With the panel members 10 successively mounted in spaced, aligned relationship on the conveyor line 12, the latter moves the panel members 10 in a path of travel above the storage bins 14–20. The panel members 10 are removed from the conveyor line 12 by the previously discussed removing means where operation is initiated by selective actuation of one of the motor members 54–58. For example, assume that it is desired to remove one of panel members 10 from the conveyor 12 and place the same in the storage bin 16; under these conditions, the motor member 56 is actuated to extend the rod member 64 downwardly when the forward portions or "leading edge" of the panel member 10 which is to be removed is aligned immediately beneath the roller member 68. Upon actuation of the motor member 56, the roller member 68 moves downwardly between the lateral spacing between the belts 26 and 28 into force transmitting, rolling engagement with the upper face of the panel member 10 thereby separating such leading edge from the belts 24–30. As the belts 24–30 continue to move in a left to right direction as viewed in FIG. 1, the upper face of the panel member 10 desired to be removed rolls along the roller member 68 and proceeds in an inclined direction to the right, downwardly until lower edges of the deflection member 74 likewise engage the upper face thereof while the trailing edge or left most portions of the face of the panel member 10 continue to be retained in face to face engagement with the belts 24–30 by air suction through the slots 46 and 48. With further movement of the belts 24 and 26, the roller member 68, in combination with the deflection member 62, continue to "peel" the panel member 10 from the conveyor line 12 until the upper face of the panel member 10 is completely separated from the belts 24–30, and/or the leading edge of the panel member 10 engages the upper edge portion 86 of the wall 80 thereby preventing further horizontal movement of panel 10 at which time the latter is induced by gravity to fall away from the conveyor line 12 toward the stack 94.

In the event that it is not desired to remove the panel members 10 from the conveyor line 12 into one of the storage locations 14–18, it is apparent that the panel member 10 is retained on the lower face of the belts 24-30 by air suction applied slots 46 and 48 and freely passes, in clearing relationship, by the lower edges of the roller members 68 which are spaced thereabove, and past the upper edges of the deflection members 70 which remain stationarily spaced below the lower face of the panel members 10.

From the foregoing, it is apparent that the invention provides a novel means of selectively removing the panel members 10 from a conveyor line 12 into various storage bins 14-20 which is particularly useful in sorting the panel members 10 according to grade, style, type, etc. In the case of panel members 10 delivered to the storage bin 20, the apex of the deflection member 76 becomes wedged between the panel member 10 and the belts 24-30 as the leading edge of the panel member 10 engages the deflection member 76. Upon continued movement, the leading edge of the panel member 10 slides along the downwardly inclined surface 81 of the deflection member 76 thereby separating the panel member 10 from the conveyor line 12 and breaking the air seal therebetween so that the panel member 10 falls by force of gravity onto the stack 91.

Although two pairs of endless belts provided with a pair of longitudinal slots therebetween have been disclosed herein for creating the necessary suction for holding the panel members 10 against the conveyor line 12 above the storage bins 14-20, other equivalent constructions might be devised to provide the same results. For example, a single air plenum might be employed in lieu of the plenums 32 and 34 which includes a plurality of perforated areas in the bottom wall thereof adjacent the lower face of a single endless belt trained around the plenum. The endless belt would include a plurality of perforated areas therein adapted to register with the perforations in the bottom wall of the plenum as the belt moves around the latter. A pair of laterally spaced motor members, similarly to those motor members 54-58 described above, could be provided on opposite lateral sides of the combination of the plenum and belt to apply the necessary downwardly directed force on opposite lateral sides of the panel member passing therebeneath.

At this point, it is clear that the invention also provides a novel method of delivering a plurality of panel members to selected locations along a path of travel. This method involves releasably suspending the panel members in horizontally, aligned, end to end relationship beneath a support; moving the support along the path of travel above each of the locations; slidably engaging an upper surface of selected ones of the panel members; applying a downwardly directed force on forward portions of the upper face of the engaged panel member as the latter approaches one of the locations in order to urge these forward portions away from the support; and, diverting the engaged panel members away from the support means as the latter is moved along the path in order to release the panel member from the support and allow gravity induced delivery of the panel member to a selected location.

From the foregoing, it will be observed that the present transport system not only provides for the reliable accomplishment of the object of the invention, but does so in a simple and economical manner. It is recognized, of course, that those skilled in the art may make various modifications or additions to the preferred embodiment chosen to illustrate the invention without departing from the gist and essence of the present contribution to the art. Accordingly, it is to be understood that the protection sought and to be afforded hereby should be deemed to extend to the subject matter claimed and all equivalents thereof fairly within the scope of the invention.

What is claimed is:

1. A system for successively deliverying a plurality of panel members to selected locations along a path of travel, comprising:

power operated means for conveying said panel members along said path including structure presenting planar surface areas spaced above each of said locations in opposed relationship to the latter, said planar surface areas being movable along said path upon operation of said power operated conveying means;

air suction means adjacent said conveying means and coextensive with the latter for drawing said panel members into face-to-face engagement with said movable planar surface areas of said conveying means whereby to hold said planar members against said movable planar surface areas for movement with the latter along said path;

means for removing said panel members from said movable planar surface areas including a plurality of selectively actuatable elevationally shiftable members adjacent at least certain of said locations and normally disposed above said movable planar surface areas, said shiftable members being operable upon actuation thereof for shifting downwardly into contact with portions of the face of said panel members at said certain locations and urging said contacted panel members downwardly away from the influence of said air suction means whereby said contacted members are drawn by gravity force to said locations, said removing means further including a plurality of stationary deflection members respectively associated with said certain locations and extending transversely across said path of travel between said conveying means and said locations, each of said deflection members being longitudinally spaced downstream along said path of travel from the respectively associated shiftable member, each of said deflection members having upper edges thereof spaced below said panel members for normally allowing the latter to move therepast along said path of travel, lower edges of said deflection members being spaced below the elevation of the lower extremity of the corresponding shiftable member contacting one of said panels whereby to slidably engage the face of said contacted panel member contacted by said shiftable member and urge said contacted panel member downwardly away from said conveying means toward the respectively associated location, and abutment means respectively associated with each of said locations and extending transversely across said path of travel, each of said abutment means being elevationally spaced below said lower edges of the respectively corresponding deflection member and operative for engaging the leading edge of a contacted panel member whereby to terminate the travel of said contacted panel member along said path.

2. The system of claim 1 wherein:

said conveying means includes at least a pair of side-by-side laterally spaced apart belts each extending longitudinally along said path of travel, and said air suction means includes an air plenum communicating with said space between said belts and means communicating with said air plenum for drawing air through said space between said belts into said air plenum whereby to create an air suction in said space.

3. The system of claim 2, wherein said air plenum includes a pair of opposed lip portions extending into said space adjacent each of said belts for preventing the latter from lateral movement into said space.

4. The system of claim 2, wherein:

said conveying means includes two pair of said belts, each of said pair of said belts being laterally spaced apart, said air plenum communicating with said space between said belts in each pair thereof whereby to create air suction in said space between said belts in each of said pairs thereof, and said shiftable members are disposed in the spacing between said pairs of said belts.

5. A method of delivering a plurality of panel members to selected locations along a path of travel, comprising the steps of:

releasably suspending said panel members horizontally in aligned, end-to-end relationship beneath a support;

moving said support along said path of travel above said locations;

slidably engaging the upper face of a selected one of said panel members;

applying a downwardly directed force on forward portions of said upper face of said engaged panel member as the latter approaches one of said locations whereby urging said forward portions away from said support and release said forward portions from said support; and diverting said slidably engaged panel member against the lower edge of a fixed deflection member and away from said support means as the latter is moved along said path whereby to release said slidably engaged panel member from said support and allow gravity induced delivery of said released panel member to said one location.

6. The method of claime 5, wherein the step of releasably suspending is performed by producing a partial air vacuum between said upper face of each of said panel members and said support.

* * * * *